Dec. 7, 1926.

A. E. KENNARD 1,609,411

ELECTRICAL INSTALLATION FOR RAILWAY AND LIKE VEHICLES

Filed Dec. 1, 1925     5 Sheets-Sheet 1

FIG. 1.

Inventor
Alfred E. Kennard,
by
Attorney.

Inventor:
Alfred E. Kennard
by Henry Orth Jr
Attorney.

Patented Dec. 7, 1926.

1,609,411

UNITED STATES PATENT OFFICE.

ALFRED ERNEST KENNARD, OF UPPER NORWOOD, LONDON, ENGLAND, ASSIGNOR TO J. STONE & COMPANY LIMITED, OF DEPTFORD, ENGLAND, A COMPANY INCORPORATED OF GREAT BRITAIN.

ELECTRICAL INSTALLATION FOR RAILWAY AND LIKE VEHICLES.

Application filed December 1, 1925, Serial No. 72,498, and in Great Britain November 18, 1924.

This invention comprises improvements in and connected with electrical installations for railway and like vehicles. Heretofore, there have been two principal types of installation for the generation of current for various purposes on railway vehicles. In the first type of installation a dynamo driven from a carriage axle by a so-called slipping belt was employed, the tension of the belt being regulated so that when the train speed was sufficient for producing the desired maximum output, the belt slipped on its pulley and prevented that output being exceeded upon further increase in train speed. In the second type of installation a self-regulating dynamo was employed and was driven by a relatively tight belt so that the dynamo at all times ran at a speed more or less proportionate to that of the train speed. In this case, the dynamo could not exceed a given output owing to the self-regulating character imparted to it in its electrical design. In both types of installation there were generally increased power losses at the higher speeds.

Increasing demands are made in respect of the comfort and convenience of railway travellers and a substantial supply of heat produced by electrical means is an important item in these demands. Also, demands are made for electric fans for ventilating purposes. With either of the installations above referred to, it is a matter of great difficulty to satisfy those demands, particularly in the case of sleeping cars requiring efficient heating and restaurant or kitchen cars requiring heat for cooking, heating water and like services, for the dimensions and weight of the dynamos and their driving gears situated beneath the under-framing of the vehicles are necessarily limited, and increase in output necessarily demanded either a larger dynamo or an increased speed of driving.

The object of the present invention is to provide an installation which is adapted for satisfying all reasonable demands whilst employing dynamos and driving gear of practical dimensions or dimensions comparable to those of existing equipments.

According to this invention, a dynamo is employed of which the speed generally varies proportionately to the train speed, as for example, a dynamo driven by a relatively tight belt, and automatic means are employed for enabling excess generation by the dynamo to be utilized in heating or other useful circuits for so long as excess or super normal generation continues. It is advantageous to arrange for the dynamo to generate a constant current, or to generate up to a predetermined maximum current, no matter what speed may be reached, but to generate a voltage which is not limited or is not restricted within reasonable or practical limits. The automatic means effects such a control that when the normal voltage is exceeded, such increased voltage is applied to a suitable circuit which is cut-in in series with the normal load. As an example, let it be assumed that a restaurant car is fitted with a dynamo, a battery, and a cooker circuit, connected across the battery. In such a case, the dynamo at normal voltage will supply the cooker circuit and charge the battery from which current is taken for heating the cooking appliances when the dynamo is not available. In the event of the speed increasing above the speed at which the belt would slip in the ordinary way, the automatic means insert in series between the dynamo and the battery one or more sections of a heater which may be utilized for heating or boiling water. Thus, the voltage applied to the battery for charging it is kept about constant, as also is the current, but the excess voltage is employed in driving that current through the auxiliary heaters, whereby a supply of hot water may be stored up for subsequent use as washing-up water, or for the making of beverages, or the hot water may be employed for heating a compartment or saloon. Or the auxiliary heaters may be used for the direct heating of sleeping or other compartments, or for the increased or supplementary heating of any heating or cooking apparatus. In addition to the increased output thus made use of it will be seen that the advantage is secured that the drive is more effective and efficient than it is in the case of the slipping belt drive.

The automatic means above referred to may be a governor-operated switch and rheostat adapted for cutting in a resistance section at a given speed and of thereafter increasing the number of sections as the speed increases. The said resistance sections may be heater coils in a water container in which case the body of water would constitute a heat accumulator. Or, the said resistance sections might be heater coils on a mass of cast iron, for example, the said mass being enclosed in a heat insulating jacket and formed with water ducts so that it constitutes a heat accumulator and can be used as an electric geyser in known manner. Or the automatic means may comprise a regulator motor for the rheostat or it may be a voltage solenoid, or a combined voltage and series solenoid, the core of which is in operative connection with a control switch and rheostat. Or a governor device or voltage solenoid or electromagnetic switch may be used for controlling a small relay motor adapted for operating the rheostat, as will be readily understood. Any of these devices may work over a series of contacts for causing a series of contactor switches to be progressively operated for the progressive switching in and out of the auxiliary resistances or circuits.

The belt driving gear would be adapted for the transmission of the increased speed and power, which would be demanded at the higher speeds as compared with the speed and power for which the ordinary equipment is designed, but in view of the economical mode of driving and working which results, the pulley dimensions would not necessarily be greater than those customarily employed and might even be less. The dynamo would be modified to the extent required for enabling it to withstand the relatively elevated tensions which would be generated at the higher speeds, and such modifications would be developed in accordance with practical dynamo design.

Dynamos generating with self-excitation would require automatic control of the excitation in order to give constant excitation and constant current output, in spite of the variable terminal voltage. However, separate excitation, as by the battery equipment, would be adopted with advantage in some cases. Between the cut-in speed and the speed at which excess voltage is generated, the charging current generated by the dynamo would grow, but would remain approximately constant after the cutting in of the auxiliary load as aforesaid, owing to the stepwise cutting in of the auxiliary heater sections in series.

These improvements are not limited to purely heating installations, as it would be possible to supply lighting circuits from the battery, as well as, or in place of, heating or cooker circuits, and to have the auxiliary heater circuits cut-in in the manner hereinbefore described.

Instead of the automatic insertion of auxiliary resistance heaters upon a pre-determined speed, voltage or output being exceeded, fans or other power circuits may be inserted, or a battery or a varying number of accumulator cells may be inserted. Where the installation comprises a lamp circuit and a battery for the same, this battery may be charged during the normal output of the dynamo and a separate battery may be inserted in series during super normal output, this latter battery being used for supplying fan motors or other electrical units. Or, the two batteries may be under control of a change-over switch adapted for periodically interchanging their connections so that each battery in turn will regulate or will receive normal charging current. Where the second battery is cut in cell by cell, for example, a suitable automatic switching is capable of being readily devised whereby the charging will commence with the cells at one end of the battery on one occasion and with the cells at the other end of the battery on the next occasion, and in that way all the cells will be kept about in a state of uniform charge.

It would of course be possible to utilize one and the same automatic device for effecting cut-in and subsequently the insertion of the resistance or battery cells as aforesaid. In some cases, it may be arranged for the automatic means also to cut-in resistance into the field magnet windings circuit, so that the field may be progressively reduced as the terminal voltage rises, or so as to limit the rise in voltage at the higher speed.

It is of course a common expedient to switch in resistances to protect a circuit against excessive voltage and on vehicles driven by a petrol motor through an electric transmission the lighting battery on the vehicle has been protected against the higher voltage of the transmission installation by an automatically adjusted rheostat arrangement. Also, in the charging of batteries in installations in which the power is obtainable at a variable speed, as from windmills, tidal motors, or moving vehicles, it has been proposed to employ a number of cells connected in series the number on charge being automatically controlled by the speed of the charging means and the order in which the cells are charged being automatically reversed by suitable mechanism. The present invention, however, is concerned with vehicles having axle-driven dynamos adapted for supplying normal lighting or heating installations on such vehicles, and it provides for permitting the dynamo to generate in excess of the requirements of such normal installations and for the automatic utilization of such excess generation by useful auxiliary devices for the purpose explained above.

In order to enable the invention to be readily understood, reference is made to the accompanying drawings, illustrating examples of installations in accordance with these improvements, in which drawings:—

Figure 7$^a$ is a view of a portion of Figure 7 but the switch arm is shown in dotted lines in order to disclose a contact plate which is situated behind the switch arm in the neutral position of the latter.

Figure 1:
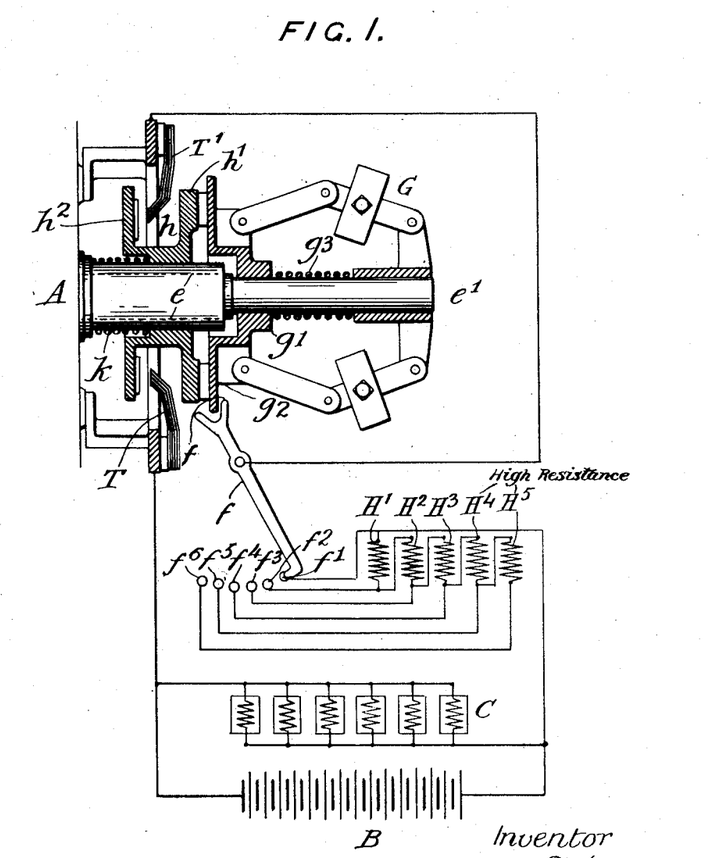
Figure 1 is a diagrammatic illustration of an installation in which auxiliary heater circuits are controlled by a centrifugal governor which also controls the operation of the cut-in switch.

Referring to Figure 1, B is a storage battery connected with a cooker circuit C, the latter comprising a number of heater elements such as are employed in the kitchen of a restaurant car, for example. A is the switchboard of a dynamo which is driven from a car axle in the usual way, but only the end of the armature spindle $e$ is seen in this figure. On an extension $e'$ of the spindle $e$ there is a centrifugal governor device G of suitable type, the governor sleeve $g'$ being formed with a disc $g^2$ which is in engagement with the forked end of a switch lever, $f$, the opposite end of such lever being movable over a number of contact studs $f'$ to $f^6$. These studs are connected up with auxiliary heater elements in a manner hereinafter described. If desired, the governor G may control an automatically reversing cut-in switch in known manner, as follows:—The disc $g^2$ when the dynamo is at rest, frictionally engages a disc $h'$ of a sleeve $h$ revolubly mounted about the spindle $e$, the sleeve $h$ also carrying a disc $h^2$ on which are disposed contact plates connected with respective brushes of the dynamo. It is not thought to be necessary to illustrate the details of this pole-changing and cut-in switch as full details of a suitable switch of this character are publicly obtainable. Suffice it to say that when the dynamo commences to revolve in one direction, the frictional engagement of the governor disc $g^2$ with the disc $h'$ causes the latter and the sleeve $h$ and disc $h^2$ to rock through an appropriate angle thereby bringing appropriate contact plates of the disc $h^2$ opposite the terminal brushes T, T'. As the speed increases, the governor weights fly out and the links pull the governor sleeve $g'$ rightwardly against the action of the governor spring $g^3$. This permits a weaker spring $k$ to force the sleeve $h$ rightwardly also, so that the contact plates on the disc $h^2$ are brought into contact with the terminal brushes T, T' and the dynamo is connected up with the work circuit, the polarity of the terminal brushes T, T' being the same for either direction of running. As soon as the travel of the sleeve $h$ is arrested by the terminal brushes T T', the governor disc $g^2$ moves out of frictional engagement with the disc $h'$ and with further increase of speed, the governor disc $g^2$ receives further rightward movement. In moving rightwardly the governor disc $g^2$ effects operation of the switch lever $f$ for the purpose hereinafter described.

The terminal brush T is connected with the negative terminal of the cooker and battery circuits, the positive terminal of these circuits being connected with contact stud $f'$. The terminal brush T' is connected with the switch lever $f$. The parts can be adjusted so that when the dynamo first cuts in, the lever $f$ is on the contact stud $f'$ so that only the cooker and battery circuits C and B are put on to the dynamo. As the speed increases, the lever $f$ is moved on to the stud $f^2$ and thereupon an auxiliary heater element H'. which is connected between studs $f'$ and $f^2$, is brought into circuit in series with the cooker and battery circuits. Further increases in speed produce further turning of the lever $f$ which passes successively over the contacts $f'$ to $f^6$ for the successive series switching in of the auxiliary heater elements H' to H$^5$ as will be readily understood. Thus, as each increase in dynamo voltage takes place, corresponding with increase in speed, such excess voltage is applied for the heating of additional auxiliary heaters, and the purpose of the invention as above stated is achieved. At this point, it may be remarked that the invention is not to be confused with arrangements in which the centrifugal or other automatic or cut-in switch device is utilized for the step-by-step varying of what is known as lamp resistance or in which such an automatic switch is employed for the step-by-step reduction of the field magnetization with increase in speed, as by the cutting in of resistance steps into the field winding circuit. As will be apparent from the foregoing explanations and description of Figure 1, the automatic switch in accordance with these improvements is utilized for the cutting in of additional useful load in series with the normal load as the speed increases, thereby making additional and more efficient use of the dynamo and driving arrangements at the higher speeds and obtaining a greater total useful output without involving enlargement of the dimensions of the dynamo or of its driving parts.

The auxiliary heaters H' to $H^5$ may be hot water heaters or storage heaters of the type already referred to but they may, of course, be heaters of any desired type provided that they are not required to be constantly supplied with current. One or more of these auxiliary heaters or windings at the end of the series may be of high resistance, for example $H^4$ and $H^5$. However, if desired, the said auxiliary heater circuit may comprise its own battery with means for the step-by-step switching in of an appropriate number of cells at each step, as will be readily understood.

Figure 2:
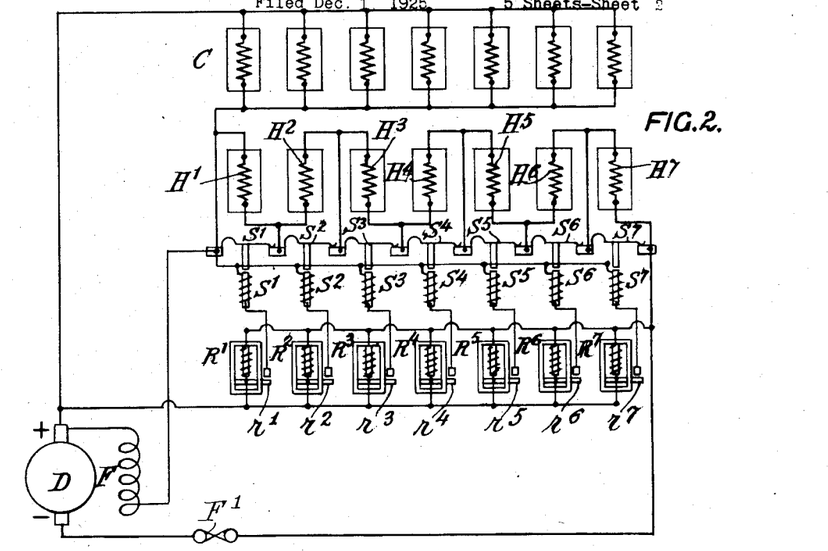
Figure 2 is a diagram illustrating the control of auxiliary heater circuits by means of voltage relays.

According to the modification illustrated in Figure 2, the parallel heaters in the cooker or other heating circuit C are connected across the dynamo D in series with the series auxiliary heater elements H' to $H^7$ but the latter are normally short-circuited by a series of solenoid switches S' to $S^7$. The windings of a series of voltage relays R' to $R^7$ are connected in parallel across the brushes of the dynamo, and the values of these windings are calibrated so that these relays will operate in succession during a rise in voltage from a given potential difference to a maximum. $r'$ to $r^7$ are the relay switches and as each is closed by its relay winding it completes the circuit of the corresponding solenoid switch S' to $S^7$. It will be seen that the solenoid windings are connected on the one hand through the relay switches and relay lead with the positive brush of the dynamo and on the other hand with the negative end of the normal heating circuit C between which and the positive brush an approximately constant voltage is maintained. The device F' is a fuse which is suitably included in the negative main.

At speeds below the speed pre-determined for the operation of the first relay R', current passes from the positive brush of the dynamo to the cooker circuit C and back to the negative brush by way of the short-circuiting switch brushes $s'$ to $s^7$. At the pre-determined speed and voltage the winding of relay R' becomes sufficiently powerful for closing its switch $r'$ thereby completing the circuit of the winding of the solenoid $S'$. The latter thereupon sucks up its core and opens the switch brush $s'$ so that the heater element H' is brought into circuit in series with the cooker circuit C. It will be observed that the opening of the switch brush $s'$ also puts the heater element H' into series with the solenoid winding S' and with the field magnet windings F. The relays $R^2$ to $R^7$ operate in a similar manner for further increase in speed and voltage up to the maximum, so that the heater elements $H^2$ to $H^7$ are successively added in series, as will be apparent. In the final stages, the connection of most or all of these elements in series with the field windings F provides a satisfactory safeguard in the event of a breakdown in one of the circuits of a nature likely to permit the dynamo to generate an unduly excessive voltage. In the modification illustrated in Figure 3, the switching in of the auxiliary heater elements H' to $H^6$ in series with the cooker circuit C by means of a switch lever $f$ moving over contact studs $f'$ to $f^7$ is similar to that described with reference to Figure 1, excepting that in Figure 3 the lever $f$ is operated by a reversible motor M instead of by a governor device. The commutator brushes of the motor M are connected with respective switch contacts $l^2$ $l^3$ insulatedly mounted on one arm of a lever $l$ the opposite arm of the latter being connected with the core of a solenoid S. A spring $l'$ connected with the first arm of the lever $l$ acts in opposition to the solenoid winding and constantly tends to lower that arm for bringing the contacts $l^2$ $l^3$ down on to fixed contacts $l^4$ and $l^5$ respectively. The action of the solenoid S is to raise the said arm and bring the contacts $l^2$, $l^3$, on to fixed contacts $l^6$ and $l^7$ respectively. The fixed contacts $l^4$ and $l^7$ are connected with the main negative conductor of the installation and the fixed contacts $l^5$ $l^6$ are connected with the junction between the series auxiliary heater circuit and the circuit C of the parallel main heaters. The field winding M' of the motor M is connected between the field winding or "battery" terminal on the terminal board of the dynamo D and the main negative conductor and the winding of the solenoid S is connected in parallel with the motor field winding. It will be noticed that the positive terminals of the solenoid and motor field windings are also connected with the junction between the cooker and heater circuits. The hub of the lever $f$ is formed with a worm wheel $m'$ with teeth around part of its periphery and the spindle $m$ of the motor M is provided with a worm meshing with the worm teeth.

Figure 3:
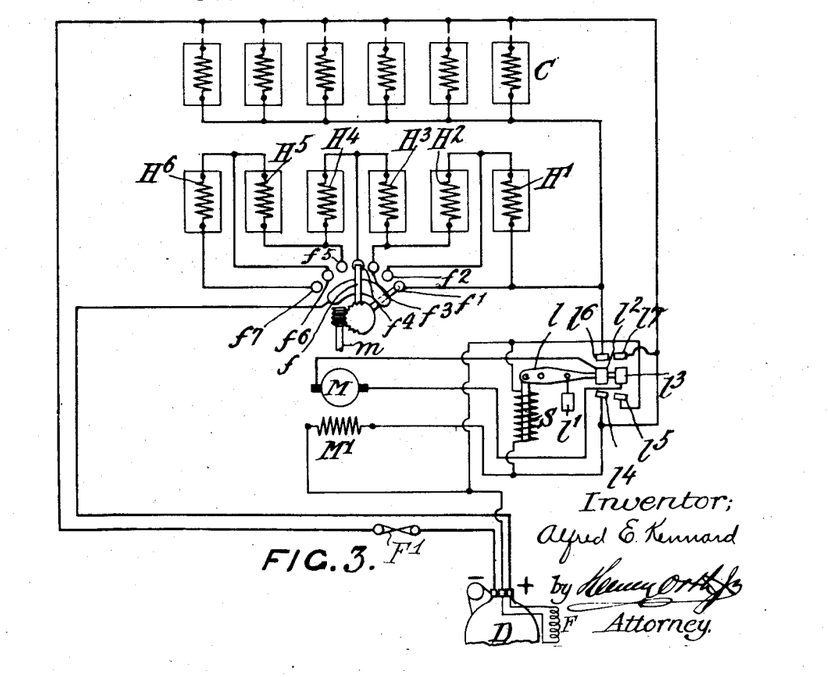
Figure 3 is a diagram illustrating the control of auxiliary heater circuits by means of an automatically controlled reversible motor.

The operation according to Figure 3 is as follows:—At the start, the lever $f$ is on the first contact stud $f'$ and the dynamo current only to the circuit C. As the speed rises the pull of the solenoid winding on its core partly overcomes the action of the spring $l'$ on the lever $l$, so that the latter is moved to the mid-position shown and no current passes through the armature of the motor M. As the speed increases, the voltage on the stud $f'$ increases and there is an increased potential difference across the winding of the solenoid S and the motor field winding M′. Thereupon, the solenoid winding ultimately overcomes the spring $l'$ and sucks in its core so that the lever $l$ is rocked in the direction for lifting the contacts $l^2$ $l^3$ into touch with the fixed contacts $l^6$ $l^7$. Some of the current from the positive terminal of the dynamo then passes through the armature of the motor in the direction for revolving it for turning the lever $f$ counter clockwise. Thus the lever $f$ comes on to the contact stud $f^2$ and cuts in the first heater element H′ in series with the cooker circuit C. The reduction in the potential difference across the solenoid winding due to the cutting in of the heater H′ between the lever $f$ and stud $f'$ is sufficient for weakening the solenoid to such an extent as to permit the spring $l'$ to prevail and bring the lever $l$ back to the mid-position for breaking the armature circuit of the motor M, so that the lever $f$ is left upon the stud $f^2$. Further increases in speed and voltage will result in the operation being repeated and further counter clockwise movements of the lever $f$ for switching in additional auxiliary heaters $H^2$ to $H^6$, as will be readily understood. At any moment when the speed and voltage decrease, the solenoid is so far weakened as to permit the spring $l'$ to pull down its arm of the lever $l$ and lower the contacts $l^2$ $l^3$, into touch with the fixed contacts $l^4$ $l^5$. The direction of current through the motor armature is then the reverse of what it was before so that the lever $f$ will be turned clockwise step-by-step for cutting out auxiliary heaters, as will be understood without further description. The non-toothed part of the worm-wheel M′ prevents the possibility of overrunning of the switch arm $f$ its arm reaching the limit of its travel in either direction.

Figures 4, 5:
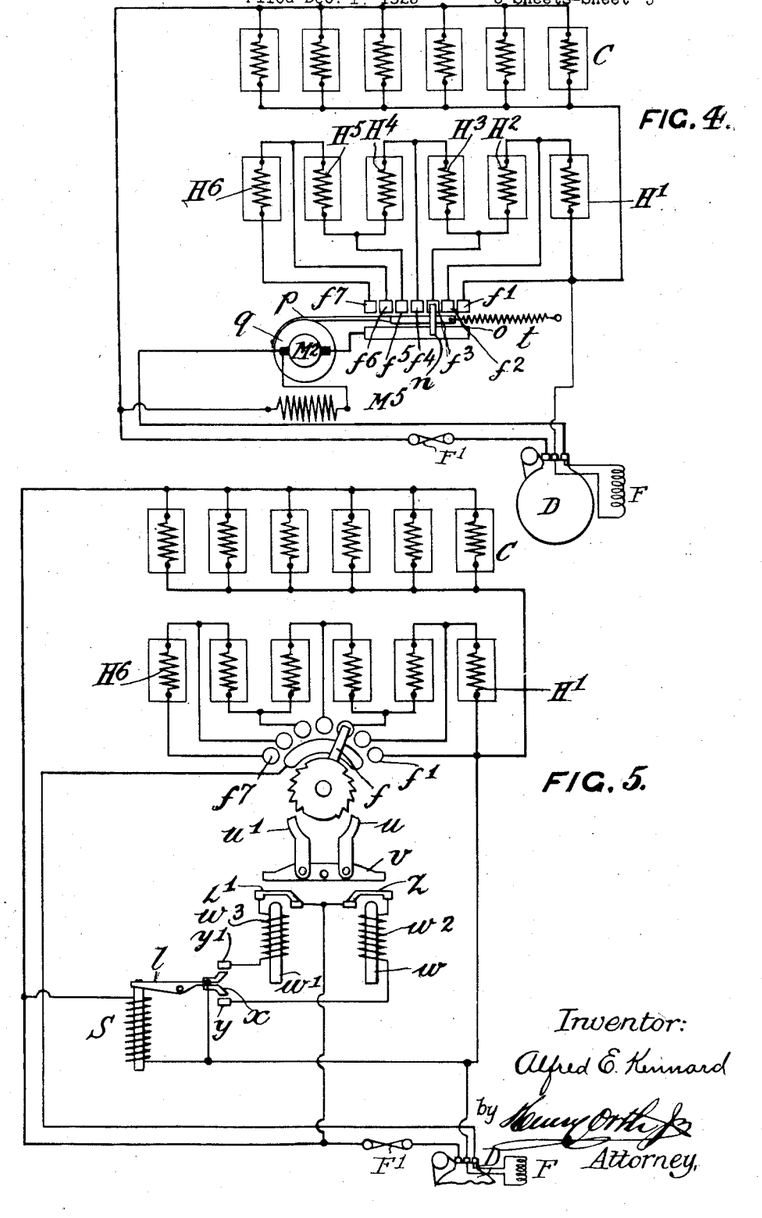
Figure 4 is a diagram illustrating the control of auxiliary heater circuits by means of an oscillatory motor device.
Figure 5 is a diagram illustrating the control of auxiliary heater circuits by means of solenoids operating a reversible step-by-step feed device.

In Figure 4, the contact studs $f'$ to $f^n$ for the progressive switching in of the auxiliary heaters are arranged in a straight line and the series is traversed by a gliding contact $n$ which slides over a parallel contact bar $o$. The sliding contact $n$ is connected by a flexible band $p$ with a pulley disc $q$ of an oscillatory motor armature $M^2$ through which the working current is passed. The field winding $M^5$ of this motor is connected between the positive lead from the dynamo D and the negative main lead. A connection is taken from the field winding or battery terminal on the dynamo to the stud $f'$ for a purpose which will appear. A spring $t$ connected with the slider resists the pull of the motor armature $M^2$.

The operation of the arrangement seen in Figure 4 is as follows:—When the dynamo is stationary or is being driven at low speed, the slider $n$ is on the first stud $f'$ so that any current generated passes direct to the heaters of the circuit C. Owing to the connection of the field winding or battery terminal on the dynamo with the first stud $f'$ battery voltage is initially applied across the motor field. As the dynamo voltage grows, the same is applied to the coil $M^5$ and when the dynamo voltage exceeds the battery voltage and the current through the motor armature has become sufficiently strong the motor overcomes the pull of the spring $t$ and moves the slider $n$ on to the stud $f^2$, thereby cutting in the first auxiliary heater H′ as in the arrangements above described. Further rises of voltage or of voltage and current will result in further increase in the torque of the motor and further movements of the slider $n$ for the cutting in of additional auxiliary heater elements $H^2$ to $H^6$. Decreasing speed or voltage weakens the motor torque and the spring $t$ is then permitted to pull back the slider $n$ for the cutting out of the auxiliary heater elements.

Figure 5 is somewhat similar to Figure 3, excepting that the switch arm $f$ is operated by an electro-magnetically controlled step-by-step feed mechanism instead of by a reversible motor. In Figure 5 opposite halves of the hub of the lever $f$ are formed with oppositely inclined ratchet teeth, one set of teeth being adapted for being operatively engaged by a pawl $u$ and the other set by a pawl $u'$. These pawls are carried by respective arms of a tiltable lever $v$, the said arms being disposed in the paths of respective solenoid cores $w$, $w'$. A control solenoid S has its winding connected on the one hand to the negative main conductor and on the other hand with a field winding or battery terminal on the dynamo D, this terminal also being connected to the first contact stud $f'$. A lever $l$ has one arm operatively connected with the core of the solenoid S, the other arm being connected with the positive side of the solenoid coil and carrying a double contact brush $x$ disposed between upper and lower fixed contacts $y$ $y'$. The contact $y$ is connected with the positive terminal of a solenoid winding $w^2$ which influences the core $w$ and the contact $y'$ is connected with the positive terminal of a solenoid winding $w^3$ which influences the core $w'$. The negative ends of the coils $w^2$, $w^3$ are connected through switches $z$ $z'$ with the negative main conductor and the brushes of these switches $z$ $z'$ are also disposed in the path of respective cores $w$ $w'$.

The operation of the arrangement in Figure 5 is as follows:—When the dynamo is stationary or running at low speed, the lever $f$ is on contact stud $f'$ so that any current generated passes direct to the cooker circuit C. The lever $l$ is maintained in the mid-position illustrated by spring operation opposing the effort of the solenoid due to energization of its coil connected between the battery terminal on the dynamo and the negative main. As the speed and voltage increase, the voltage on the stud $f'$ increases and owing to the connection of this stud with the battery terminal, this increased voltage is applied to the solenoid coil, whereupon the solenoid pulls up its core and tilts the lever $l$ in the direction for causing the brush $x$ to make contact with the fixed contact $y$. The coil $w^2$ is now energized and the core $w$ is sucked up so that it strikes the switch brush $z$ and the right hand arm of the tiltable lever $v$. By striking the brush $z$ the solenoid opens its own circuit and the core immediately drops, and by striking the arm of the tiltable lever $v$ the pawl $u$ engages one of the right hand set of ratchet teeth and feeds the lever $f$ counter clockwise one step on to the contact stud $f^2$ thereby cutting in the auxiliary heater H'. The voltage applied to the solenoid coil S is thus diminished, so that it will not suck up its core again until a further rise of dynamo voltage has taken place. The further operation of this step-by-step feed mechanism in either the same or the reverse direction will be apparent without further description.

Figure 6:
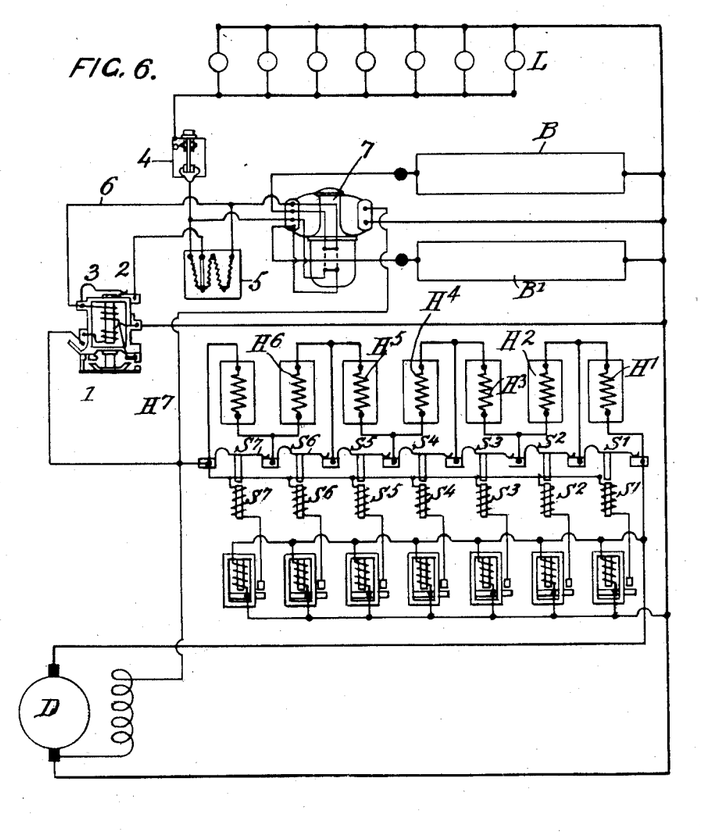
Figure 6, is a diagram illustrating the control of auxiliary circuits, such as is seen in Figure 2, applied to a double battery train lighting installation.

According to Figure 6 an arrangement is adopted very similar to that illustrated in Figure 2, but instead of a cooker circuit C as in the latter figure, a double battery lighting circuit is substituted. In Figure 6, the auxiliary heaters H' to H$^7$ are inserted in the positive main leading from the dynamo D to the battery and lighting circuits hereinafter referred to and are normally short-circuited by the switches $s'$ to $s^7$. The connection, control and operation of the solenoids S' to S$^7$ are similar to those described with reference to Figure 2. The positive main continuing from the auxiliary heaters is taken to a known electro-magnetic cut-in switch comprising a shunt coil 1, a series coil 2 and a lamp resistance short-circuiting switch 3. When cut-in takes place, the switch 3 is opened and current proceeds through the conductor 6, the lamp resistance 5 and lighting switch 4 to the lamps L. The conductor 6 is also connected with a known automatic battery change-over switch 7 which in one operation puts the battery B direct on to the dynamo for charging and the battery B' in series with the lamp resistance and in the next operation interchanges the connections of these batteries in the manner well-known in the art. Thus, Figure 6 illustrates how the auxiliary heaters can be introduced step-by-step into series with a combined battery and lighting circuit as the speed and voltage increase and become greater than is required or safe for the charging of the battery and lighting of the lamps.

Figure 7:
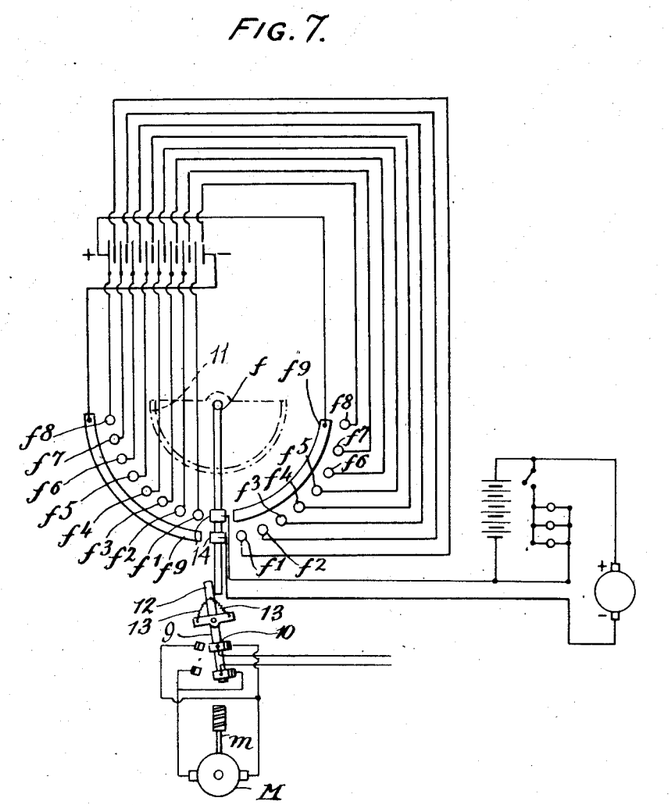
Figure 7 is a diagram illustrating automatic switching means adapted for cutting in a secondary battery cell by cell, on one occasion from one end and on the next occasion from the opposite end.
Figure 7A:
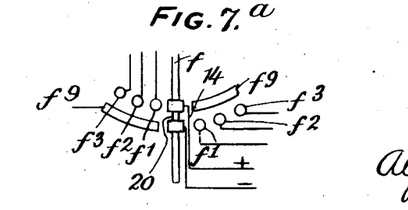

Figure 7 illustrates automatic switching means adapted for the progressive switching in of cells of a battery in series with the normal load comprising lamps L and battery B for the same. In this diagram, the brushes of a reversible motor M are connected with the fixed contacts of a reversing switch the lever 9 of which is operated as hereinafter described by the step-by-step cut-in switch arm $f$ driven by the spindle $m$ of the motor. It will be understood that the reversible motor M is primarily under control of a relay responsive to voltage changes as described with reference to Figure 3 but this relay is not shown in Figure 7. It is further to be understood that the worm shown on the motor spindle $m$ is in mesh with the worm wheel sector 11 connected with the switch arm $f$ although the worm and worm wheel sector are shown separated in the diagram. The reversing switch lever 9 of T form is suspended from a pivot 10 and carries a pivoted arm 12 which is kept in the mid-position by springs 13. The switch arm $f$ carries two insulated contacts 14 connected in series with the generator D and the work circuit, and is seen in Figure 7 to be in the mid-position in which contact is made with a contact plate 20, Figure 7$^a$, and continuity of the work circuit is preserved. If the motor M operates to drive the switch arm $f$ clockwise the contacts 14 of the arm $f$ pass from the contact plate 20 on to the contact segment $f^9$ and one or other of the contact studs $f'$ to $f^8$ to the left of the arm $f$. This segment $f^9$ is connected with the negative pole of the battery and the studs $f'$ to $f^8$ are connected with the positive poles of successive cells, and in this way, the battery cells are cut in successively from the negative end in series with the work circuit. In its initial clockwise movement, the arm $f$ simply clicks past the pivotal spring-operated arm 12 of the reversing switch. As the dynamo voltage falls, the motor M will run reversely and turn the arm $f$ counter clockwise and as the arm $f$ approaches the mid-position it engages the arm 12 and effects the reversal of the switch arm 9. Thus upon the next operation, the motor M will drive the arm $f$ counter clockwise, the contacts 14 thereupon passing on to the segment $f^9$ and studs $f'$ to $f^8$ to the right hand of Figure 7. In its initial movement, the arm $f$ clicks past the arm 12 as before and in passing over the studs cuts in the cells one by one from the positive end, the negative poles of the cells being connected with these studs and the positive pole of the battery being connected with this segment $f^9$.

When sectional resistance heaters are inserted as hereinbefore described, the last two or three steps or sections such as $H^4$ and $H^5$, Figure 1, may have a very high resistance value for the purpose of protecting the installation. For example, if an interruption occurred between the cells or plates of an accumulator, the dynamo voltage would rise excessively, but this would be guarded against, for properly calibrated voltage control would then automatically effect the insertion of the sectional resistance up to its last and highest sections.

Naturally, the arrangements may be so devised that the belt would slip at extremely high speeds as a safety expedient but in this case the wear on the belt due to slip and the power lost during such times as slipping occurred, would be negligible. The improvements enable a more effective and efficient drive to be maintained, they enable a more powerful transmission to be effected with limited pulley and belt dimensions and tension, and they enable a dynamo to have an exceedingly low cut-in speed without incurring waste at the higher speeds.

I claim:—

1. Electrical installation for railway and like vehicles comprising in combination, a dynamo driven at vehicle speed throughout substantially the whole range of such vehicle speed, a battery and a translating device in parallel in the dynamo circuit, auxiliary current consuming devices between the dynamo and said parallel battery and translating device, and automatic means for the progressive cutting in of said auxiliary devices in series with said parallel battery and translating device.

2. Electrical installation for railway and like vehicles comprising in combination, a dynamo driven at vehicle speed throughout substantially the whole of such speed, a battery and a translating device in parallel thereto in the dynamo circuit, means dependent upon the vehicle speed to automatically connect such battery and translating device in the dynamo circuit, a series of current utilizing devices, and automatic means to successively connect said current utilizing devices in series with said paralleled battery and translating device, the last of said series of current utilizing devices being of high resistance.

3. Electrical installation for railway and like vehicles comprising in combination, a dynamo driven at a speed corresponding with the speed of the vehicle throughout substantially the whole range of such vehicle speed, a battery and current utilizing devices connected in parallel in the dynamo circuit, automatic cut-in means operative for cutting in said dynamo at a pre-determined vehicle speed, auxiliary devices between the dynamo and said parelleled battery and current utilizing devices and adapted for utilizing excess voltage produced by said dynamo when its speed exceeds a given value, said auxiliary devices being also adapted for giving further useful service on said vehicle, and automatic means adapted for the progressive cutting in of said auxiliary devices in series with said paralleled battery and current utilizing devices.

ALFRED ERNEST KENNARD.